United States Patent
Aizawa

(10) Patent No.: US 10,718,274 B2
(45) Date of Patent: Jul. 21, 2020

(54) EXHAUST PRESSURE CONTROL VALVE

(71) Applicant: Auto Advance Aizawa Co., Ltd., Sapporo, Hokkaido (JP)

(72) Inventor: Kazutami Aizawa, Sapporo (JP)

(73) Assignee: Auto Advance Aizawa Co., Ltd., Sapporo (JP)

( * ) Notice: Subject to any disclaimer, the term of this patent is extended or adjusted under 35 U.S.C. 154(b) by 148 days.

(21) Appl. No.: 15/758,755

(22) PCT Filed: Aug. 29, 2016

(86) PCT No.: PCT/JP2016/075184
§ 371 (c)(1),
(2) Date: Mar. 9, 2018

(87) PCT Pub. No.: WO2017/043354
PCT Pub. Date: Mar. 16, 2017

(65) Prior Publication Data
US 2019/0360405 A1 Nov. 28, 2019

(30) Foreign Application Priority Data

Sep. 11, 2015 (JP) .................................. 2015-179658

(51) Int. Cl.
*F02D 9/04* (2006.01)
*F02D 9/10* (2006.01)
(Continued)

(52) U.S. Cl.
CPC ............... *F02D 9/04* (2013.01); *F02D 9/103* (2013.01); *F02B 2075/025* (2013.01);
(Continued)

(58) Field of Classification Search
CPC combination set(s) only.
See application file for complete search history.

(56) References Cited

U.S. PATENT DOCUMENTS 3,703,937 A * 11/1972 Tenney ................... F01N 1/165
181/226
6,050,294 A 4/2000 Makowan
(Continued)

FOREIGN PATENT DOCUMENTS

JP        05340276 A    12/1993
JP        07279676 A    10/1995
(Continued)

OTHER PUBLICATIONS

International Search Report dated Oct. 17, 2016 (PCT/JP2016/075184).

*Primary Examiner* — Binh Q Tran
(74) *Attorney, Agent, or Firm* — Alix, Yale & Ristas, LLP

(57) ABSTRACT

The present invention provides an exhaust gas pressure control valve which allows discharge of exhaust gases from entire cross-sectional area of the exhaust gas pipeline when the exhaust gas pressure control valve completely. An exhaust gas pressure control valve is mounted on a gas pipeline having a first cross-section where exhaust gas from engine communicates and disposed upstream or downstream of a muffler. The exhaust gas pressure control valve comprises: a housing having a first cross-sectional surface and a second cross-sectional surface larger than the first surface and connected to the gas pipelines for communicating the exhaust gas; the valve axis supported along the second cross-section not overlapping with the first cross-section when viewed from the flowing direction, the valve axis supported by the housing in a crossing direction to the flowing direction; and a valve element connected to the valve axis and adjusts flow of the exhaust gas communicating to the gas pipeline.

10 Claims, 7 Drawing Sheets

(51) Int. Cl.
  *F02B 75/02*   (2006.01)
  *F02D 9/02*    (2006.01)
  *F16K 1/20*    (2006.01)
  *F16K 15/03*   (2006.01)
(52) U.S. Cl.
  CPC .... *F02D 2009/0279* (2013.01); *F16K 1/2007* (2013.01); *F16K 15/033* (2013.01)

(56) References Cited

U.S. PATENT DOCUMENTS

| | | | |
|---|---|---|---|
| 7,434,570 B2 | 10/2008 | Hill | |
| 9,121,315 B2 * | 9/2015 | Abram | F01N 13/08 |
| 9,388,719 B2 * | 7/2016 | Kainuma | F01N 1/083 |
| 9,982,793 B2 * | 5/2018 | Thomas | B23P 15/002 |
| 2007/0095605 A1 | 5/2007 | You | |
| 2013/0233269 A1 * | 9/2013 | Houtschilt | F01N 1/163 |
| | | | 123/188.1 |
| 2016/0222863 A1 * | 8/2016 | Middleton, Jr. | F16K 15/033 |

FOREIGN PATENT DOCUMENTS

| | | | |
|---|---|---|---|
| JP | 3029656 U | 10/1996 | |
| JP | 0913996 A | 1/1997 | |
| JP | 11294136 A | 10/1999 | |
| JP | 2002256897 A | 9/2002 | |
| JP | 2011032955 A | 2/2011 | |
| WO | 2010151391 A1 | 12/2010 | |

* cited by examiner

EXHAUST PRESSURE CONTROL VALVE

BACKGROUND

The present invention relates to an exhaust gas pressure control valve disposed in an exhaust system of the engine for reducing the flow of the exhaust gas. Particularly, the present invention relates to an exhaust gas pressure control valve disposed between a muffler and outside or between an engine and muffler which reduces engine noise generated while exhausting gas.

The exhaust gas pressure control valve, which is disposed along the exhaust gas pipeline, is used as an exhaust break system for diesel vehicles such as truck and bus or as a warm-up system while the engine is idling during cold days. Japan unexamined patent publication No. 2011-032955 discloses an exhaust gas control valve which has simple configuration and allows smooth rotation regardless of the size of the exhaust gas pressure. Patent Literature 1: JP Unexamined Patent Publication No. 2011-032955 A1

However, the exhaust gas pressure control valve disclosed in '955 is formed with predetermined thickness, and the valve axis of the exhaust gas pressure control valve is disposed traverse to the center of the exhaust gas pipeline. Therefore, when the exhaust gas pressure system valve opens completely, the valve thickness and valve axis acts as a resistance against the system. In other word, the cross-sectional area of the exhaust gas pipeline becomes smaller by amount of the valve thickness and projection area of the valve axis at an exhaust gas pressure control valve.

SUMMARY

Therefore, the present invention provides an exhaust gas pressure control valve which allows to exhaust gases from entire cross-sectional area of the exhaust gas pipeline when the valve opens completely.

An exhaust gas pressure control valve of a first aspect is that, the exhaust gas pressure control valve is mounted on a gas pipeline having a first cross-section where exhaust gas from engine communicates and is disposed upstream or downstream of a muffler. The exhaust gas pressure control valve comprising; a housing having a first cross-sectional surface and a second cross-sectional surface larger than the first surface and connected to the gas pipelines for communicating the exhaust gas; a valve axis supported along the second cross-section not overlapping with the first cross-section when viewed from the flowing direction and supported by the housing in a crossing direction to the flowing direction; and a valve element connected to the valve axis and adjusts flow of the exhaust gas communicating to the gas pipeline.

An exhaust gas pressure control valve of a second aspect of a present invention further comprises a driving unit for driving the valve element for adjusting flow of the exhaust gas by the valve element. The driving unit can be all types of elastic elements including coil springs for providing elasticity of to a rotation of the valve element. The flow of the exhaust gas is controlled using the elastic elements. An exhaust gas pressure control valve of another aspect is that, the flow of the exhaust gas is closed by tilting the valve element by 45 to 70 degrees relative to the airflow direction.

According to the present invention, when the exhaust gas pressure control valve opens completely, gases are exhausted from entire cross-sectional area of the exhaust gas pipeline.

DETAILED DESCRIPTION

First Embodiment

Figure 1:
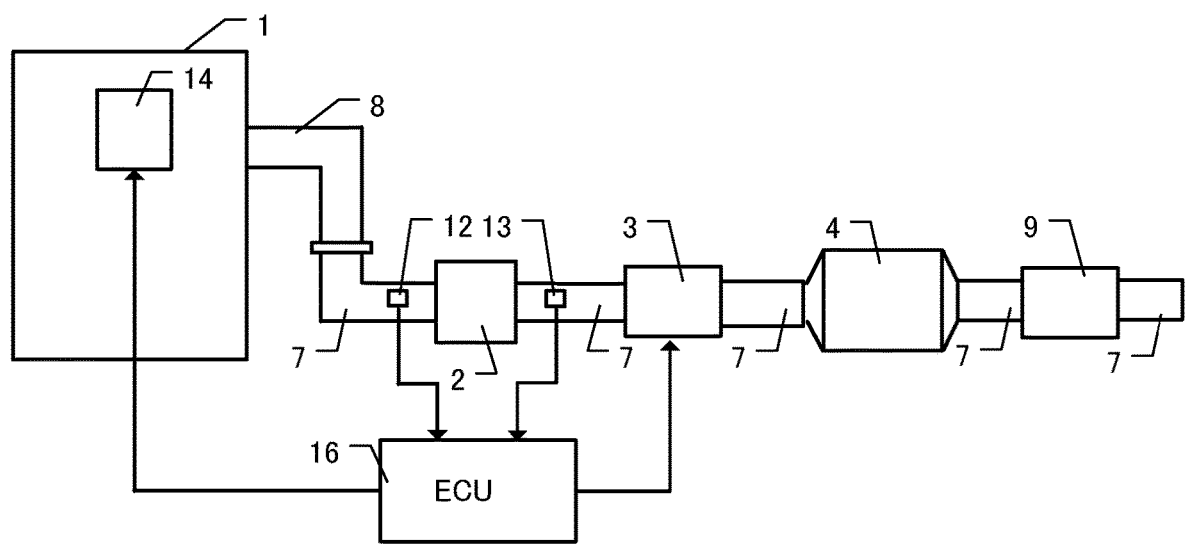
FIG. 1 is a schematic diagram illustrating the exhaust system of engine 1.

FIG. 1 is a schematic diagram illustrating the exhaust system of a diesel engine ("engine") 1. The exhaust system of engine 1 comprises a DPF (diesel particulate filter) apparatus 2, a first exhaust gas pressure control valve 3, a muffler 4 and a second exhaust gas pressure control valve 9. Additionally, the exhaust system of the engine 1 further comprises an ECU (engine control unit) 16 for controlling a fuel pump 14 and a first exhaust gas pressure control valve 3 of the engine 1. An exhaust gas manifold 8 of the engine 1 is connected to an exhaust gas pipeline 7 having a circular cross-section. The DPF apparatus 2 disposed downstream of the exhaust gas pipeline 7 comprises a ceramic filter and oxidation catalyst inside the DPF apparatus which collects particulates and graphite in the exhaust gas. The downstream of the DPF apparatus 2 is connected to the first exhaust gas pressure control valve 3 via exhaust gas pipeline 7. The first exhaust gas pressure control valve 3 is disposed to control gas pressure exhausted from the engine 1. The muffler 4 is connected downstream of the first exhaust gas pressure control valve 3 via the exhaust gas pipeline 7. The muffler 4 reduces exhaust noise generated during discharge of the exhaust gas. The downstream of the muffler 4 is connected to the second exhaust gas pressure control valve 9 via the exhaust gas pipeline 7. The second exhaust gas pressure control valve 9 is disposed to improve fuel efficiency of engine 1. The second exhaust gas pressure control valve 9 also reduces exhaust noise and collects particulates and graphite in the DPF apparatus 2.

On the DPF apparatus 2, the pressure sensor 12 for detecting pressure of the exhaust gas is disposed upstream of the exhaust gas pipeline 7 and the pressure sensor 13 for detecting pressure of the exhaust gas is disposed downstream of the exhaust gas pipeline 7. The DPF apparatus 2 purifies the exhaust gas by collecting particulates and graphite in the exhaust gas. The exhaust gas purified in the DPF apparatus 2 is transferred to the first exhaust gas pressure control valve 3 and the muffler 4. The exhaust gas is discharged through the second exhaust gas pressure control valve 9 disposed downstream of the muffler 4.

In the first embodiment, the second exhaust gas pressure control valve 9 is mounted downstream of the muffler 4 of a conventional vehicle. The first exhaust gas pressure control valve 3 is a general pressure control valve mounted to the conventional vehicle. Thus, the pressure control valve is disposed in traverse to a center of a pressure gas pipeline with circular valve axis. On the other hand, a valve axis of the second exhaust gas pressure control valve 9 is situated at a position outside of the circular cross-sectional area of the exhaust gas pipeline. The second exhaust gas pressure control valve 9 will be explained in detail.

Figure 2A:
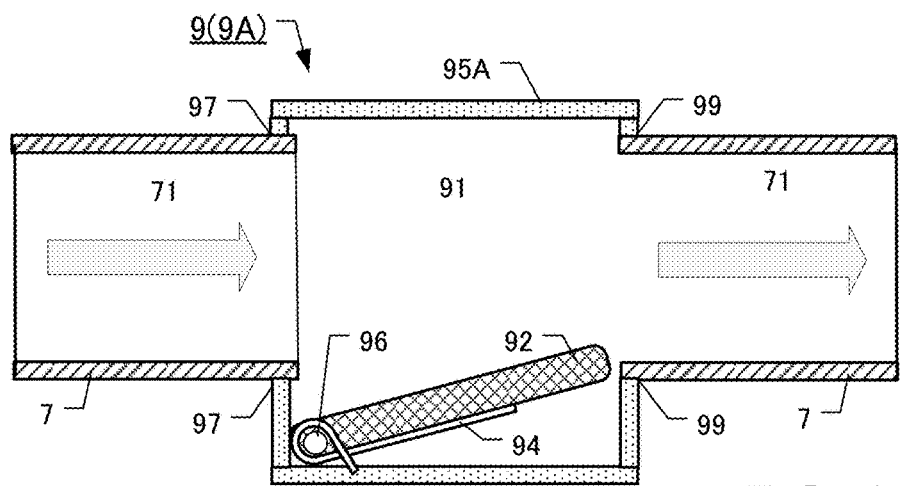
FIGS. 2A-2D are the schematic diagrams of the second exhaust gas pressure control valve 9A of the second exhaust gas pressure control valve 9.
Figure 2B:
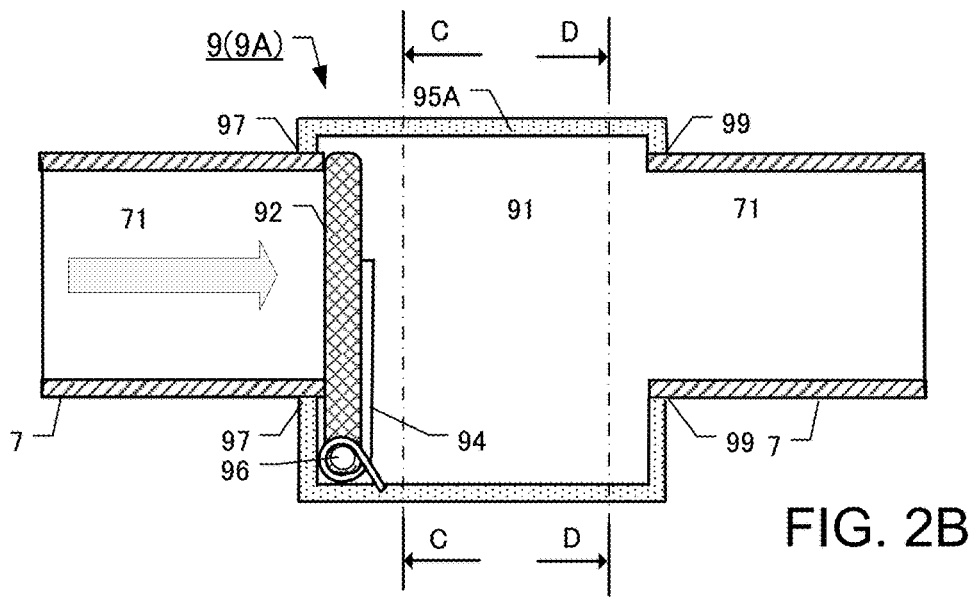
Figure 2C:
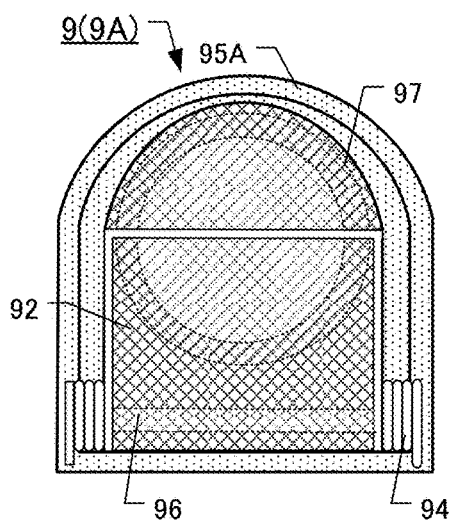
Figure 2D:
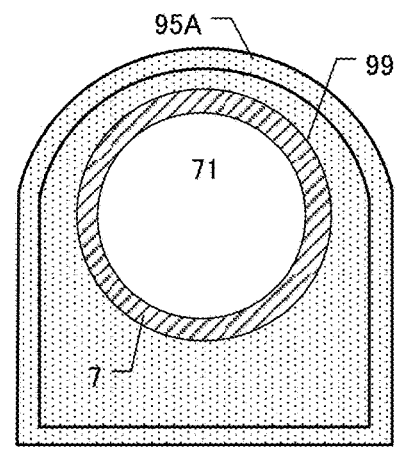

FIGS. 2A-2D are the schematic diagrams of the second exhaust gas pressure control valve 9A of the second exhaust gas pressure control valve 9. FIG. 2A is a cross-sectional diagram of the second exhaust gas pressure control valve 9A with a valve element 92 being opened. FIG. 2B is a cross-sectional diagram of the second exhaust gas pressure control valve 9A with a valve element 92 being closed. FIG. 2C is a cross-sectional diagram of FIG. 2B taken along C-C line and viewed from bore 91 to the upstream direction. FIG. 2D is a cross-sectional diagram of FIG. 2B taken along D-D line and viewed from bore 91 to the downstream direction. The arrows indicate airflow direction of the exhaust gas.

Configuration of Second Exhaust Gas Pressure Control Valve 9A

As shown in FIGS. 2A and 2B, a housing 95A of the second exhaust gas pressure control valve 9A comprises an opening 97. The downstream exhaust gas pipeline 7 of muffler 4 is attached to the opening 97. An opening 99 is disposed downstream of the housing 95A in which the exhaust gas pipeline 7 is mounted thereon. The exhaust gas pipeline 7 of the housing 95A may be eliminated and the gas may be exhausted directly from the opening 99.

The cross-sectional area CS1 of the bore 71 of the exhaust gas pipeline 7 is smaller than the cross-sectional area CS2 of the bore 91 of the second exhaust gas pressure control valve 9A. As illustrated in FIGS. 2C and 2D, the cross-section of the bore 91 of the housing 95A has four sides with one side formed in circular arch. The diameter of the arch is slightly larger than the outer surface of the circular exhaust gas pipeline 7. The valve axis 96 is disposed on the housing 95A so that the axis is parallel to one straight side of the opposing arch. In other word, the valve axis 96 is supported by the housing 95 on the direction crossing the flowing direction of the exhaust gas.

The valve element 92 is a flat panel having a similar shape as a cross-section of the bore 91 and formed large enough to seal the bore 71 of the exhaust gas pipeline 7. The valve element 92 may be connected to the valve axis 96 in a rotatable manner, or the valve axis 96 and the valve elements may be fixed together with the valve axis 96 connected to the housing 95A in a rotatable manner. The rotation of the valve element 92 seals or opens the bore 71 of the exhaust gas pipeline 7.

A coil spring 94 is inserted on both sides of the valve axis 96 for pushing the valve element 92 in one direction. A part of the coil spring extends to a center of the valve element 92 which opposes to the flowing direction of the exhaust gas. In other words, when the exhaust gas is not flowing, the coil spring 94 forces the valve element 92 to stand at 90-degrees angle relative to a flowing direction of the exhaust gas and closes the exchange gas pipeline 7. When the exchange gas is flowing with little intensity or low pressure, the valve element 92 tilts by 40 to 80 degrees to the flowing direction and maintains the exchange gas pipeline 7 open. When the exhaust gas is flowing with large intensity or high pressure, the coil spring 94 cannot resist against the flow of exhaust gas, the valve element 92 tilts by 30-degrees to 0-degrees to the flowing direction, thus opens the exchange gas pipeline 7. In other word, the valve element 92 is capable of adjusting the opening of the exchange gas pipeline 7 depending on the exhaust gas pressure.

As illustrated in FIG. 2A, the valve axis 96 is disposed along a cross-section of the housing 95A which does not overlap with the cross-section of the exhaust gas pipeline 7 when viewed from the flowing direction. Nothing obstructs the cross-sectional area CS1 of the exchange gas pipeline 7 when the valve element 92 tilts toward the flowing direction to almost 0-degrees angle. Therefore, when the vehicle is moving at a high velocity, the gas goes out smoothly from the exhaust gas pipeline 7. This not only improves the fuel combustion but also enhances the rotation startup and response. On the other hand, the second exhaust gas pressure control valve 9A does not lose its power and torque.

The strength of coil spring should be adjusted depending on the displacement of the engine 1 and type of engines, such as gasoline engine instead of diesel engine, 2-stroke or 4-stroke engine, 4-cylinder or 6-cylinder engines etc. However, the valve element 92 needs to be tilted to almost 0-degrees relative to the flowing direction by receiving maximum exhaust gas from the engine 1. Although the first embodiment is described with a coil spring, this may be replaced with different types of elastic elements, such as board spring or torsion bar, which helps the rotation of valve element 92.

The valve element 92, housing 95A and valve axis 96 are made out of cast-metal, aluminum coated sheet, titan, Inconel or stainless steel. The stainless steel is most preferred material considering its aesthetics and resistance against temperature of the exhaust gas.

Operation in the First Embodiment

The operation for the first embodiment is described hereinbelow. The ECU 16 inputs the detection signals of each sensor for detecting operation condition of engine 1. ECU 16 controls the amount of fuel supply and timing for supplying fuels to engine 1 by controlling the engine pump 14 based on the detection signals. The exhaust gas from engine 1 flows into the DPF apparatus 2 via exhaust gas manifold 8 and exhaust gas pipeline 7.

The DPF apparatus 2 collects particulates and graphite. As the pressure loss of the DPF apparatus 2 increases, such loss appears as a pressure difference between the upstream and downstream of the DPF apparatus 2. The ECU 16 calculates a pressure difference detected by an upstream pressure sensor 12 and a downstream pressure sensor 13 and when the pressure difference exceeds a predetermined value, closes the first exhaust gas pressure control valve 3 for regenerating filter for DPF apparatus 2.

Thereby, the exhaust gas pressure of engine 1 increases, which leads to an increase of fuel supplied to the engine 1. The exhaust gas containing the unburnt component flows into the DPF apparatus 2, which is supplied to the oxidation catalyst on the upstream filter. The unburnt component supplied to the oxidation catalyst increases the gas temperature within the catalyst due to the oxidation, which burns the particulates and graphite collected by the filter. Consequently, the filter for the DPF apparatus 2 is regenerated. When a regeneration of filter for DPF apparatus 2 is completed, ECU16 opens the first exhaust gas pressure control valve 3 and restarts the normal operation.

Some vehicles are equipped with an idling stop mechanism which prevents exhaust gas from unnecessary release when the vehicle is in stop state, meaning that the engine 1 is stopped during the normal operation. If the second exhaust gas pressure control valve 9A does not exist, the first pressure gas control valve 3 is opened, which allows the cold air from outside flowing into the proximity of engine 1 via pressure gas pipeline 7. Such back current causes the temperature decrease of the engine 1. Since the ECU 16 mainly reads the water temperature map, the fuel pump 14 supplies more fuel to the engine 1 when the vehicle starts moving than when the engine 1 is in the state of high temperature. Consequently, the idling stop mechanism causes adverse effect as far as the fuel combustion is concerned.

On the other hand, when the second exhaust gas pressure control valve 9A exists, the valve element 92 maintains the pressure gas pipeline 7 in a closed state, which prevents the cold air from outside flowing into the engine 1. This maintains the temperature of engine 1 regardless of the condition of the engine 1 and allowing the fuel pump 14 supplying appropriate amount of engine 1 when the vehicle starts operating.

Even when the vehicle is moving under the normal operation condition, the exhaust gas is not constantly flowing from the engine 1. There are periods that the exhaust gas is not flowing into the exhaust gas pipeline 7 even if the engine is multi-cylinder 2-stroke or 4-stroke engines. The exhaust gas does not flow into the exhaust gas pipeline 7 during low-speed traveling or in a state of a temporary stop during the city drive, which allows the cold air from outside flowing into the DPF apparatus 2, exhaust gas pipeline 7 or muffler 4. This causes the temperature decrease of engine 1 and when the vehicle starts moving, the fuel pump 14 supplies more fuel to engine 1 than when the engine 1 is maintained at a high temperature.

On the other hand, if the second exhaust gas pressure control valve 9A is mounted, the valve element 92 opens the exhaust gas pipeline 7 only slightly at low speed. Additionally, the valve element 92 closes the exhaust gas pipeline 7 when the cold air from outside is flowing. Therefore, even if the engine 1 is in the stopping state, the temperature of the engine 1 is maintained, thus improves the fuel efficiency. During the high-speed driving, the valve element 92 tilts toward almost 0-degrees direction in relative to the flowing direction, allowing the gas to exhaust from entire cross-section of the exhaust gas pipeline 7 and maximizes the engine capability.

Example of Diesel Engines

The fuel improvement was measured by driving Mitsubishi Canter (KK-FE82DG), which has a diesel engine of 4,890 cc displacement. The experiment was performed by driving at a same road under same speed.
  Driving distance before mounting second exhaust gas pressure control valve 9A: 4.3 km per liter.
  Driving distance after mounting second exhaust gas pressure control valve 9A: 5.3 km per liter.
  The fuel efficiency increased by 23.3% with the second exhaust gas pressure control valve mounted onto the downstream of muffler 4.

Example 2 for Gasoline Engine

The first embodiment was based on the exhaust system for diesel engine. However, this may be applied to the gasoline engine in a similar manner.

The fuel improvement was measured by driving Mitsubishi Pajero Mini (E-H56A), which has a gasoline engine of 660 cc displacement. The experiment was performed by driving at a same road under same speed.
  Driving distance per liter before mounting second exhaust gas pressure control valve 9A: 6.4 km per liter.
  Driving distance per liter after mounting second exhaust gas pressure control valve 9A: 9.5 km per liter.
  The fuel efficiency increased by 46.2% with the second exhaust gas pressure control valve 9A mounted onto the downstream of muffler 4.

Figure 3A:
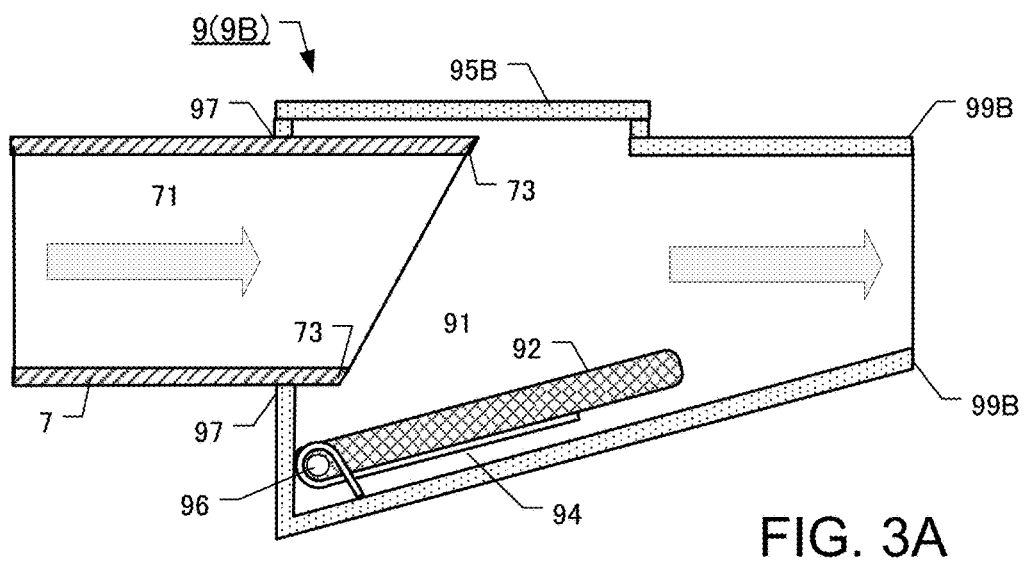
FIGS. 3A-3C are the schematic diagrams of the second exhaust gas pressure control valve 9B and 9C.
Figure 3B:
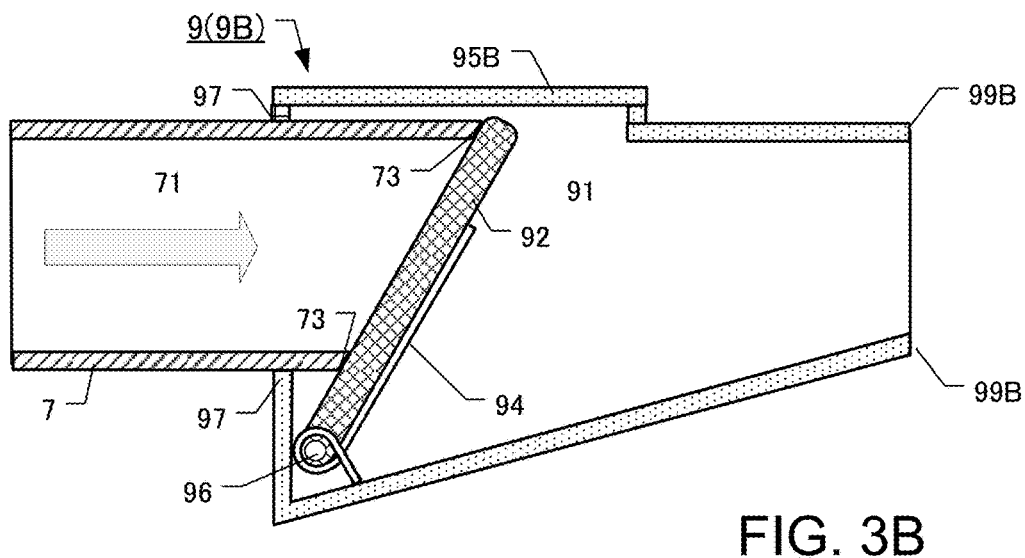
Figure 3C:
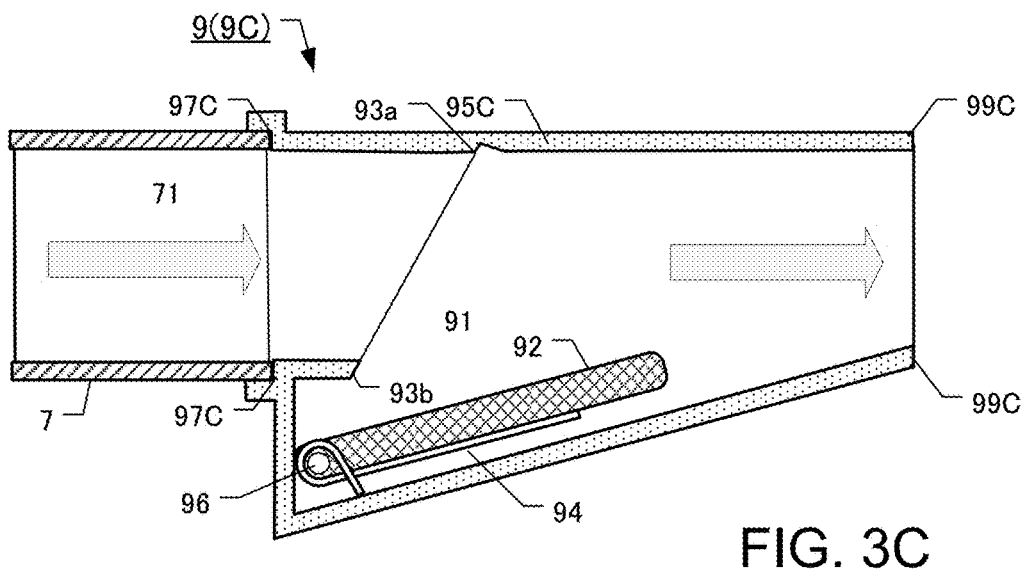

Alternative Embodiment 1: Configuration of Second Exhaust Gas Pressure Control Valve 9B FIGS. 3A-3C are the schematic diagrams of the second exhaust gas pressure control valve 9B. FIG. 3A is a cross-sectional diagram indicating a valve element 92 with the second exhaust gas pressure control valve 9B is opened. FIG. 3B is a cross-sectional diagram indicating a valve element 92 with the second exhaust gas pressure control valve 9B is closed. The same numerals were assigned for the alternative embodiment 1 as the previously-explained second exhaust gas pressure control valve 9A.

As illustrated in FIGS. 3A and 3B, the housing 95B of the second exhaust gas pressure control valve 9B comprises an opening 97 with an exhaust gas pipeline 7 mounted downstream of the muffler 4 of the opening 97. An oblique opening 73 opened at 70 to 45 degrees from a flowing direction of exhaust gas is formed on an end of the exhaust gas pipeline 7. An opening 99B is disposed downstream of the housing 95B. The exhaust gas pipeline 7 is not disposed downstream of the housing 95B.

The cross-section of the housing 95B has four sides with one side formed in circular arch. Such configuration is similar to the cross-section of housing 95A. The difference between two structures is that, for this embodiment, the height becomes shorter as it reaches toward downstream. The cross-sectional area of the opening 99B can be substantially similar as the cross-sectional area for CS1 of the exhaust gas pipeline 7. On the other hand, the cross-sectional area CS2 of the second exhaust gas pressure control valve 9B with the valve element 92 attached is larger than the cross-sectional area CS1 of the exhaust gas pipeline 7.

When the exhaust gas is not flowing, the valve element 92 tilts by 70 to 45 degrees relative to the flowing direction and closes communication path of the exhaust gas. When the exhaust gas is flowing with little intensity or low pressure, the valve element 92 tilts by 40 to 20 degrees relative to the flowing direction and opens the exhaust gas pipeline 7. When the exhaust gas is flowing with large intensity or high pressure, the coil spring 94 cannot resist against the flow of exhaust gas, the valve element 92 tilts by 20-degrees to 0-degrees relative to the flowing direction, thus opens the exchange gas pipeline 7.

In the aforementioned second exhaust gas pressure control valve 9A, when the valve element 92 is slightly opened, the exhaust gas flows from the exhaust gas pipeline to the bore 91 at 90-degrees angle from the flowing direction of the exhaust gas. This is difficult to exhaust the gas to outside direction. For second exhaust gas pressure control valve 9B, when the exhaust gas flows with small intensity or low pressure and the valve element 92 is opened slightly, the exhaust gas flows at 70 to 45 degrees from the flowing direction of the exhaust gas, thus allowing the gas flow in straight direction. Therefore, the gas is easily exhausted outside direction with ease.

Additionally, since it is unnecessary to tilt the valve element 92 to 90-degrees angle from the flowing direction, the height (the perpendicular direction in FIGS. 3A and 3B)

of the housing 95B can be formed lower than the housing 95A's. For second exhaust gas pressure control valve 9B, the angle of the oblique opening 73 of the exhaust gas pipeline 7 is 70 to 45 degrees relative to the flowing direction of the exhaust gas. This may be formed at 45 to 30 degrees from the flowing direction.

Second Alternative: Configuration of Second Exhaust Gas Pressure Control Valve 9C FIG. 3C is a cross-sectional diagram indicating a valve element 92 with the second exhaust gas pressure control valve 9C being opened. For second exhaust gas pressure control valve 9B, the oblique opening 73 was formed on the exhaust gas pipeline 7. For second exhaust gas pressure control valve 9C, although the opening of the exhaust gas pipeline 7 is orthogonal to the flowing direction, the valve element 92 is slanted by 70 to 45 degrees relative to the flowing direction and closes communication path of exhaust gas.

The housing 95 of the second exhaust gas pressure control valve 9C includes an opening 97C with the exhaust gas pipeline 7 attached downstream of muffler 4. The edge of the exhaust gas pipeline 7 is formed as an opening and orthogonal to the flowing direction of exhaust gas. An opening 99C is formed downstream of the housing 95C. The exhaust gas pipeline 7 is not disposed downstream of the housing 95C. The housing 95C and housing 95B has same cross-sections.

The housing 95C has a groove 93a and a rib 93b, which allows the closed valve 92 to tilt toward 70 to 45 degrees relative to the flowing direction. When the exhaust gas is not flowing, the coil spring 94 forces the valve element 92 to tilt by 70 to 45 degrees relative to the flowing direction and allowing the valve element 92 contacting the groove 93 and rib 93b, thus closing the communication path of the exhaust gas inside the bore 91. Thereby, the second exhaust gas pressure control valve 9C provides the same effect as the second exhaust gas pressure control valve 9B.

Configuration of Second Embodiment

Figure 4:
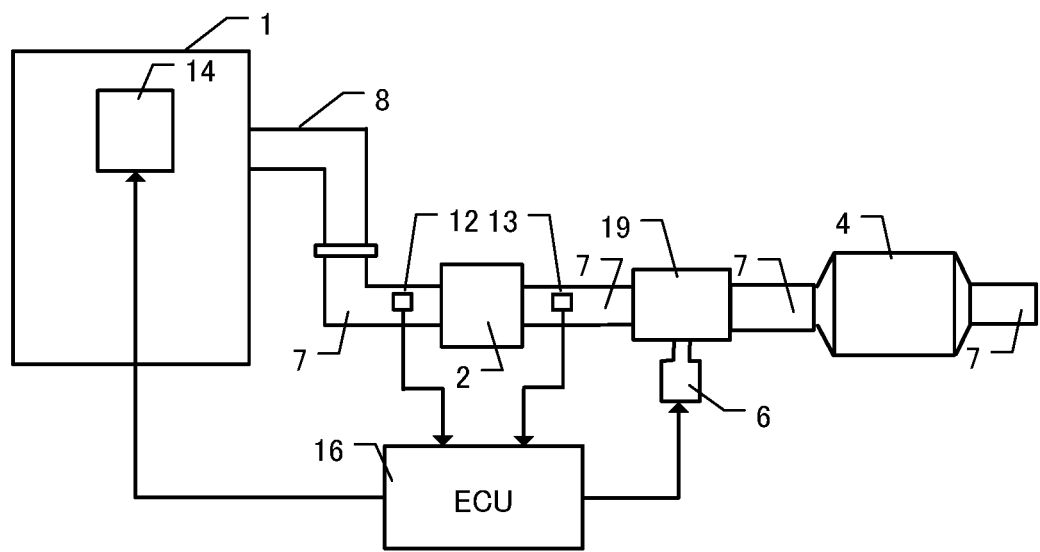
FIG. 4 is a schematic diagram of the exhaust system of the diesel engine 1.

FIG. 4 is a schematic diagram of the exhaust system of the diesel engine 1. The exhaust system of engine 1 comprises a DPF apparatus 2, a third exhaust gas pressure control valve 19 and a muffler 4. The exhaust system of the engine 1 also comprises an ECU 16 for controlling a fuel pump 14 of the engine 1 and a driving motor 6 for the third exhaust gas pressure control valve 19. The exhaust gas manifold 8 of the engine 1 is connected to the exhaust gas pipeline 7 having a circular cross-section. The DPF apparatus 2 is disposed downstream of the exhaust gas pipeline 7. The downstream side of the DPF apparatus 2 is connected to the third exhaust gas pressure control valve 19 via the exhaust gas pipeline 7. The third exhaust gas pressure control valve 19 is disposed to control and shield the exhaust gas pressure expelled from engine 1. The muffler 4 is connected downstream of the third exhaust gas pressure control valve 19 via the exhaust gas pipeline 7. The exhaust gas is discharged through the muffler 4.

On the upstream and downstream of the exhaust gas pipeline 7 of the DPF apparatus 2, the pressure sensors 12 and 13 are disposed for detecting pressure of the exhaust gas. The details regarding the third exhaust gas pressure control valve 19 which is driven by a driving motor 6 is explained herein below.

Configuration of Third Exhaust Gas Pressure Control Valve 19A

Figure 5A:
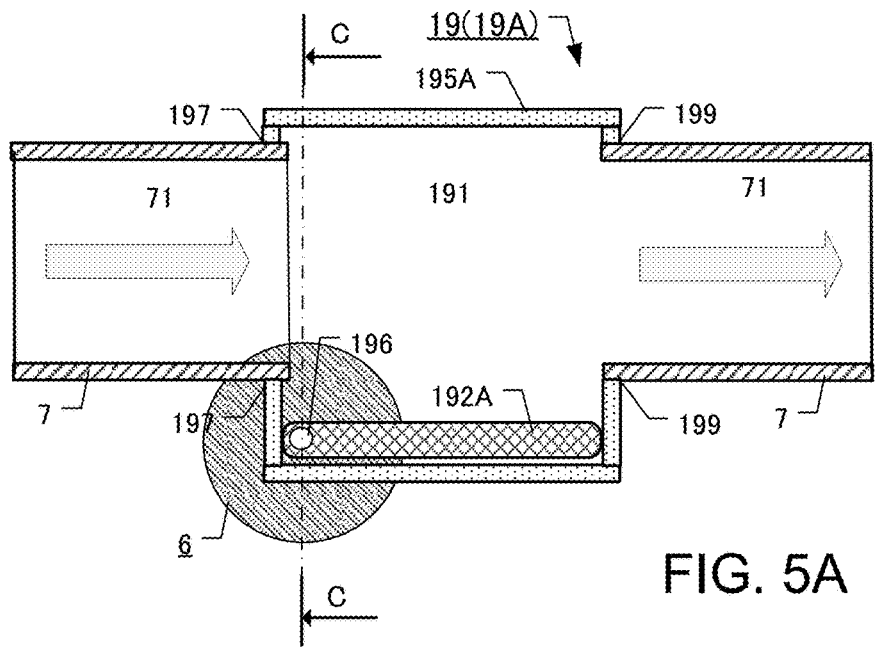
FIGS. 5A-5C are the schematic diagrams of the third exhaust gas pressure control valve 19A of the third exhaust gas pressure control valve 19.
Figure 5B:
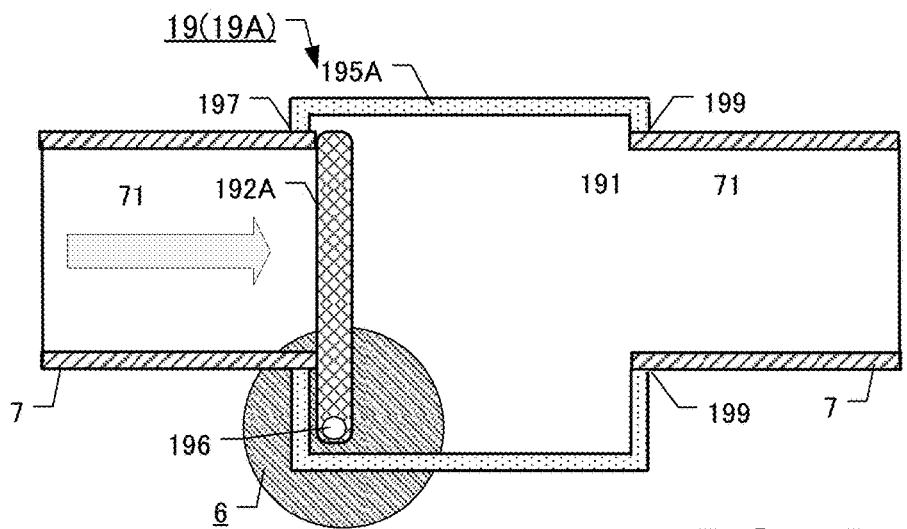
Figure 5C:
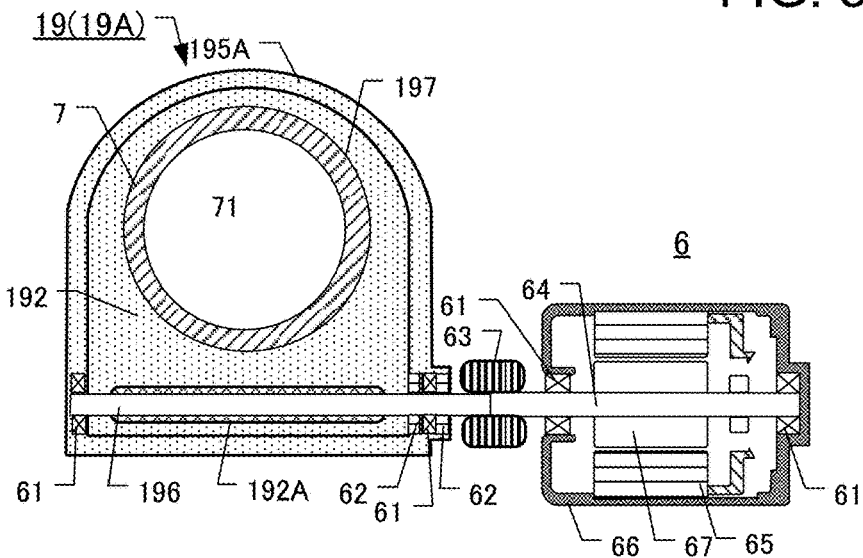

FIGS. 5A-5C are the schematic diagrams of the third exhaust gas pressure control valve 19A of the third exhaust gas pressure control valve 19. FIG. 5A is a cross-sectional diagram illustrating a valve element 192A with the third exhaust gas pressure control valve 19A being opened. FIG. 5B is a cross-sectional diagram illustrating a valve element 192A with the third exhaust gas pressure control valve 19A being closed. FIG. 5C is a cross-sectional diagram of FIG. 5A along the C-C line. The arrows indicate airflow direction of the exhaust gas.

As illustrated in FIGS. 5A and 5B, the housing 195A of the third exhaust gas pressure control valve 19A comprises an opening 197. The exhaust gas pipeline 7 of the DPF apparatus 2 is mounted downstream of the opening 197. An opening 199 is formed downstream of housing 195A with the exhaust gas pipeline mounted thereon. The valve 192A is a flat panel having the same shape as the cross-section of the bore 191 and is shaped large enough to seal the bore 71 of the exhaust gas pipeline 7.

The cross-sectional area CS1 of the bore 71 of the exhaust gas pipeline 7 is smaller than the cross-sectional area CS2 of the bore 191 of the third exhaust gas pressure control valve 19A. As shown in FIG. 5C, the cross-section of the bore 191 of the housing 195A has four sides with one side formed in circular arch. The valve axis 196 is disposed on the housing 195A so that the axis is parallel to one straight side of the opposing arch. The valve axis 196 is supported by the housing 195A on the direction crossing the flowing direction of the exhaust gas.

The valve element 192A and valve axis 196 are fixed to each other and the valve axis 196 are supported in rotatable manner by a bearing 61 inside the housing 195A. One edge of the valve axis 196 protrudes outward of the housing 195A. The protruding portion is clamped by seal rings 62 from both sides, preventing the exhaust gas from leakage. One edge of the valve axis 196 is connected to the rotating axis 64 of the driving motor 6 and the coupling 63.

The driving motor 6 comprises a casing 66, a stator coil 65 disposed on inner wall of the casing 66, a pair of bearings 61, a rotating axis 64 situated between the bearings 61 in a rotatable manner and a rotor 67 mounted on the rotating axis 64.

The driving motor 6 rotates the valve element 192A by 0 degrees (see FIG. 5A) and 90 degrees (see FIG. 5B) relative to the flowing direction and closes the exhaust gas pipeline 7. During the closing state, the valve element 192A is disposed at a position not overlapping with the cross-section of the exhaust gas pipeline 7 and allows to discharge gases from entire cross-sectional areas CS1 of the exhaust gas pipeline 7.

Operation of the Second Embodiment

Figure 6:
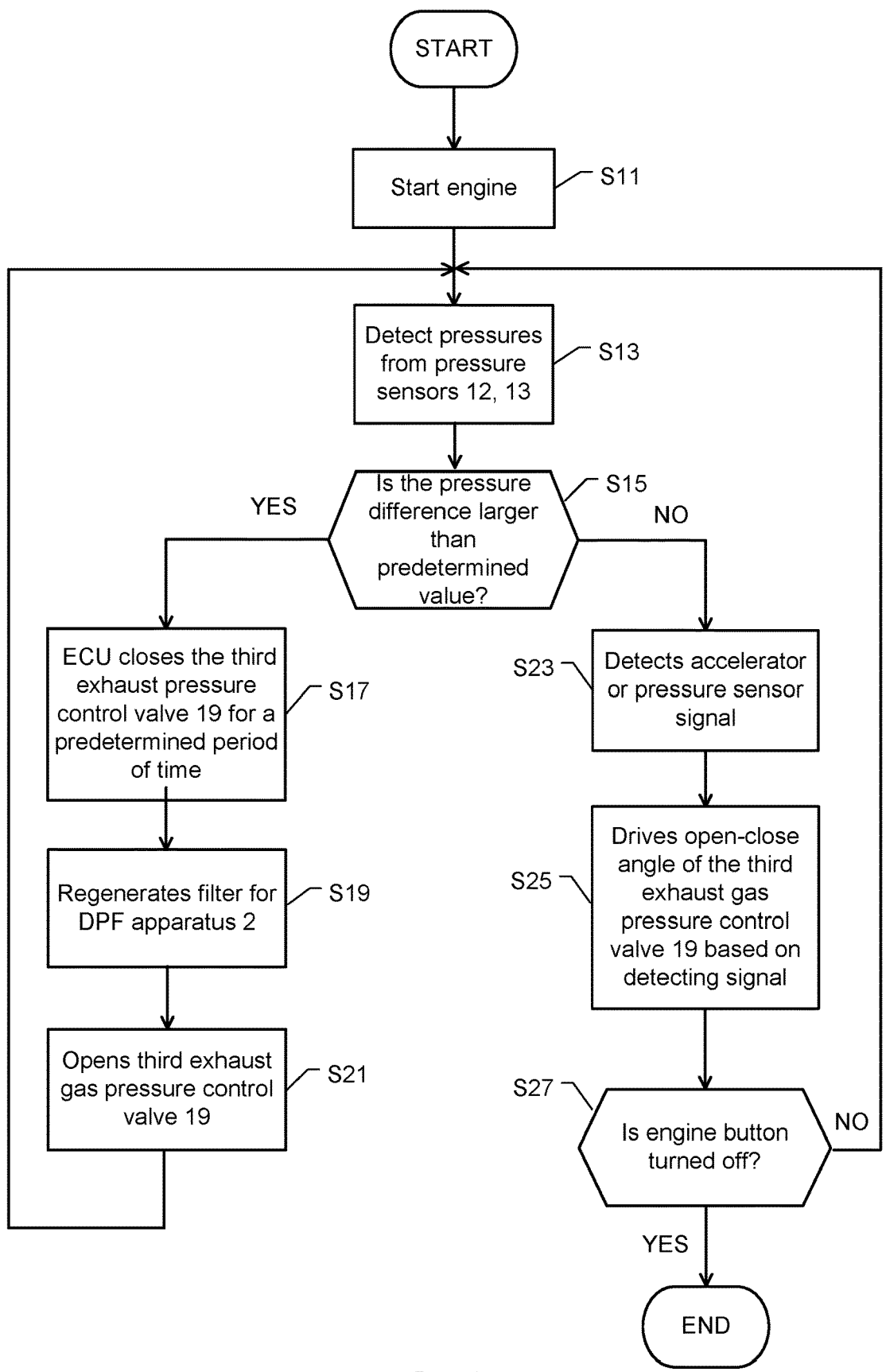
FIG. 6 is a flowchart explaining the operation of the second embodiment of the present invention.

FIG. 6 is a flowchart illustrating operation of the second embodiment.

In step S11, the operator pushes the engine start button. The engine 1 starts operation and the ECU 16 calculates the pressure difference detected by the upstream pressure sensor 12 and downstream pressure sensor 13. In step S15, the system determines whether the pressure difference exceeds a predetermined value. If the pressure difference exceeds the predetermined value (YES), the ECU 16 rotates the driving motor 6 and closes the third exhaust pressure control valve 19 for a predetermined period of time and regenerates the filter for DPF apparatus 2. This allows the flow of exhaust gas including the unburnt fuel into the DPF apparatus 2 and burns the particulates and graphite collected by the filter. Thereby the filter for DPF apparatus 2 is regenerated (step S19). When the filter regeneration is completed, the ECU16 rotates the driving motor 6 in opposite direction and opens the third exhaust gas pressure control valve 19 in a controlled manner (step S21). Then, the step S13 is restarts.

If the pressure difference is within the predetermined value during step S15 (NO), the operation is performed under a normal condition. During the normal operation, the system detects the stepping-in amount of accelerator pedal signal or the pressure signal from the pressure sensors 12 or 13 (step S23). The ECU 16 drives the driving motor 6 based on the detected signals and rotates the rotating axis 64 of the third exhaust gas pressure control valve 19 (step S25). When the ECU 16 receives the signal indicating that the stepping-in amount of accelerator pedal signal is high, ECU 16 opens the valve element 192A of the third exhaust gas pressure control valve 19 almost to 0 degrees in relation to the flowing direction of the exhaust gas. If the ECU receives the signal indicating that the stepping-in amount of accelerator pedal signal is low, the ECU 16 opens the valve element 192A of the third exhaust gas pressure control valve 19 almost to 85 degrees in relation to the flowing direction of the exhaust gas. Additionally, the system may be constituted so that the valve element 192A opens widely when the pressure from the pressure sensor 13 is large and the valve 192A opens slightly when the pressure is small. The ECU 16 may arrange the rotation amount of the rotation axis 64 of the driving motor 6 by combining the signal of the stepping-in amount of accelerator pedal signal and pressure signals from pressure sensors 12 and 13.

For idling stop mechanism which stops the engine during parking and under suspension, the third exhaust gas pressure control valve 19 is in closed state while the engine 1 is stopped.

The system shuts down when the operator shuts down the engine start button and continues driving if the start button is not turned off (step S27).

Figure 7A:
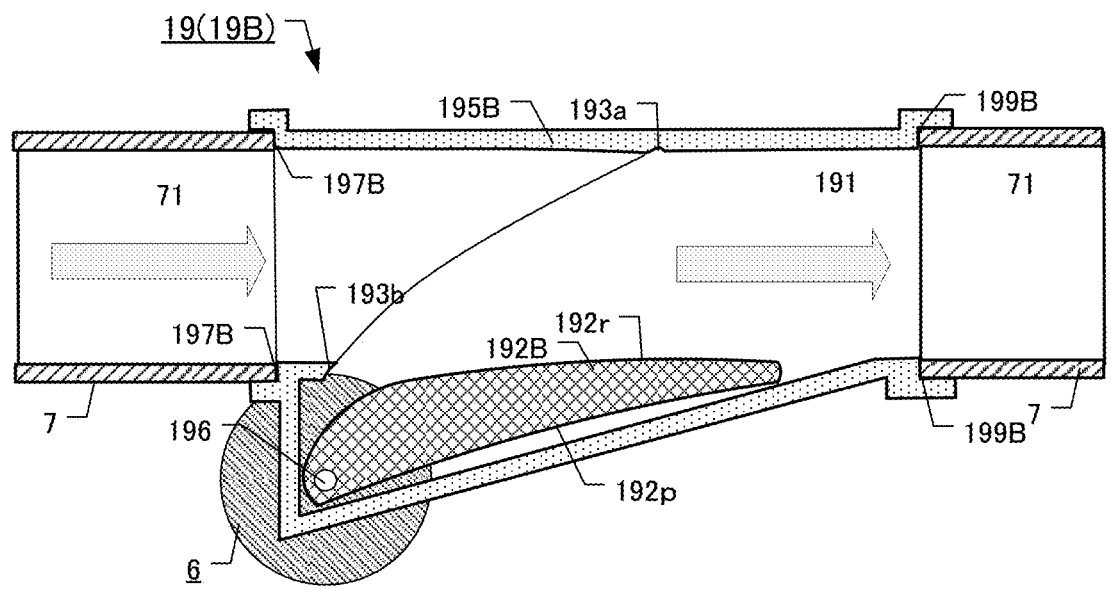
FIGS. 7A and 7B are the schematic diagrams of the third exhaust gas pressure control valve 19B.
Figure 7B:
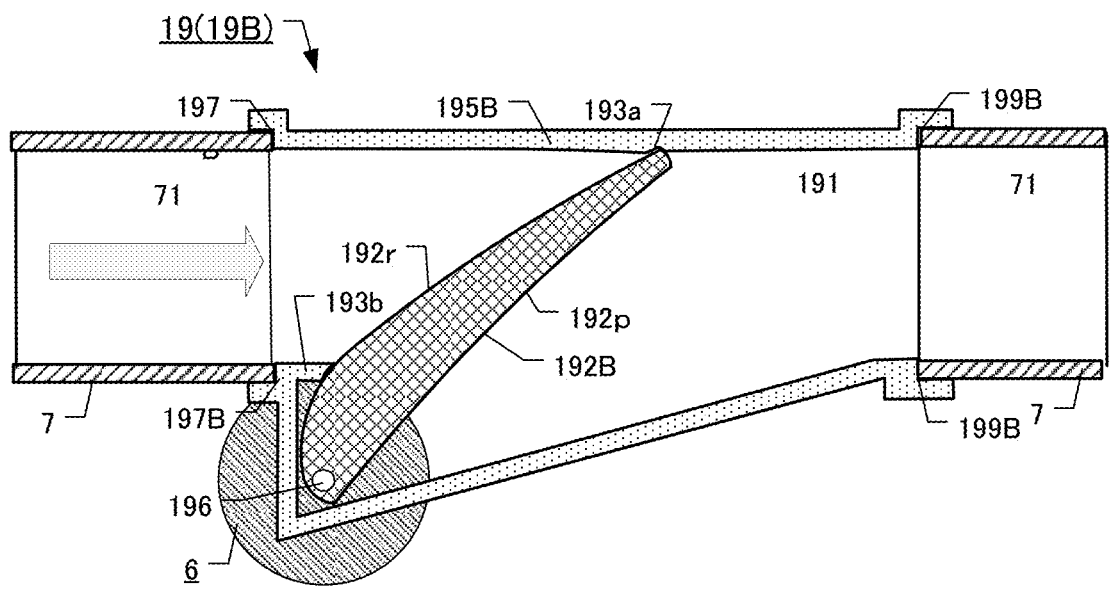

Alternative 1: Configuration of Third Exhaust Gas Pressure Control Valve 19B FIGS. 7A and 7B are the schematic diagrams illustrating the third exhaust gas pressure control valve 19B with different configuration. FIG. 7A is a cross-sectional diagram illustrating the valve element 192B with the third exhaust gas pressure control valve 19B being opened. FIG. 7B is a cross-sectional diagram illustrating the valve element 192B with the third exhaust gas pressure control valve 19B being closed. The same numerals were assigned for third exhaust gas pressure control valve 19B as the previously-explained third exhaust gas pressure control valve 19A.

As shown in FIGS. 7A and 7B, a housing 195B of the third exhaust gas pressure control valve 19B comprises an opening 197, and a downstream exhaust gas pipeline 7 of the DPF apparatus 2 is attached to the opening 197. The edge of the exhaust gas pipeline 7 is an opening which is orthogonal to the flowing direction of the exhaust gas pipeline 7. The opening 199B is disposed downstream of the housing 195B. The upstream exhaust gas pipeline 7 is disposed on muffler 4 of the opening 199B.

The cross-section of the housing 195B has four sides with one side formed in circular arch. Such configuration is similar to the cross-section of housing 195A. The difference between two structures is that the height becomes shorter as it reaches toward the downstream. The opening 199B has substantially similar cross-sectional area as the cross-sectional area for CS1 of the exhaust gas pipeline 7. On the other hand, the cross-sectional area CS2 of the third exhaust gas pressure control valve 19B with the valve element 192 attached is larger than the cross-sectional area CS1 of the exhaust gas pipeline 7.

The housing 195B has a groove 193a and a rib 193b, which allows the closed valve 192B slanting toward 45 degrees from the flowing direction. When the exhaust gas is not flowing, the coil spring 94 forces the valve element 92 to tilt by 45 degrees from the flowing direction and allowing the valve element 192B contacting the groove 193a and rib 193b, thus shutting the communication path of the exhaust gas inside the bore 191. The driving motor 6 and the valve element 192B opens based on the stepping-in amount of the pedal signal or pressure signals from pressure sensors 12 or 13.

The valve element 192B has a front side 192p and a back side 192r. The back side 192r is formed in a parabolic path from the tip to the root of the valve axis 196. The back side 192r formed in a curved shape allows the minor adjustment of the flow amount of the exhaust gas from the valve element 192B when the minute exhaust gas is flowing during the closed state of the valve element 192B.

DESCRIPTION OF REFERENCE NUMERALS

1 . . . Diesel Engine
2 . . . DPF Apparatus
3 . . . First Exhaust Gas Pressure Control Valve
4 . . . Muffler
6 . . . Driving Motor
7 . . . Exhaust Gas Pipeline
8 . . . Exhaust Gas Manifold
9, 9A, 9B, 9C . . . Second Exhaust Gas Pressure Control Valve
12, 13 . . . Pressure Sensor
14 . . . Fuel Pump
16 . . . ECU
19, 19A, 19B . . . Third Exhaust Gas Pressure Control Valve
61 . . . Bearing
62 . . . Seal Ring
63 . . . Coupling
64 . . . Rotating Axis
65 . . . Stator Coil
67 . . . Rotor
71, 91, 191 . . . Bore
92, 192A, 192B, 192b . . . Valve Element
192p . . . Front Side
192r . . . Back Side
93a . . . Groove
93b . . . Rib
94 . . . Coil Spring
95A, 95B, 95C, 195A, 195B . . . Housing
96, 196 . . . Valve Axis
97, 97C, 99, 199, 199B . . . Opening

What is claimed is:

1. An exhaust gas pressure control valve mounted on a gas pipeline having a first cross-section where exhaust gas, from an engine, communicates and is disposed upstream or downstream of a muffler, comprising:
   a housing having a first cross-sectional surface and a second cross-sectional surface larger than the first surface, the housing connected to the gas pipeline and configured to communicate the exhaust gas, wherein the second cross-sectional surface has an inclined region formed with a height that becomes shorter from upstream to downstream;

a valve axis supported along the second cross-section not overlapping with the first cross-section when viewed from the flowing direction, the valve axis supported by the housing in a crossing direction to the flowing direction; and a valve element connected to the valve axis and configured to adjust flow of the exhaust gas communicating to the gas pipeline;

wherein the valve element is configured to close a communication path of the exhaust gas by tilting the valve element by 45 to 70 degrees to the flowing direction when the exhaust gas is not flowing from the engine, wherein the housing is configured such that the exhaust gas enters the housing proximate the inclined region and opens the communication path of the exhaust gas when the exhaust gas is flowing with high intensity from the engine.

2. The exhaust gas pressure control valve according to claim 1, further comprising a driving unit for driving the valve element for adjusting flow of the exhaust gas by the valve element.

3. The exhaust gas pressure control valve according to claim 2, wherein the driving unit further comprising an elastic element for providing elasticity of to a rotation of the valve element for adjusting flow of the exhaust gas.

4. The exhaust gas pressure control valve according to claim 1, wherein a back side of the valve element upstream of the exhaust gas is curved and protruding toward an upper direction.

5. The exhaust gas pressure control valve according to claim 2, wherein a back side of the valve element upstream of the exhaust gas is curved and protruding toward an upper direction.

6. The exhaust gas pressure control valve according to claim 3, wherein a back side of the valve element upstream of the exhaust gas is curved and protruding toward an upper direction.

7. An exhaust gas pressure control valve comprising:

a housing comprising a first opening and a second opening with a length of the housing extending therebetween, the housing having a plurality of sides, wherein one of the plurality of sides comprises an inclined surface, wherein the inclined surface extends along a majority of the length of the housing; and a valve element connected to the housing, wherein the valve element is configured rotate about a valve axis between an open position and a closed position for adjusting a flow of exhaust gas between the first opening and the second opening, wherein when the valve element is in the closed position the valve element is angled relative to the first opening and the second opening, and wherein when the valve element is in the open position the valve element is substantially parallel with the inclined surface.

8. The exhaust gas pressure control valve according to claim 7, wherein the valve element is configured rotate about 45 to about 70 degrees from the closed position to the open position.

9. The exhaust gas pressure control valve according to claim 7 further comprising a coil spring connected to the valve element, wherein the coil spring is configured to bias the valve element to the closed position.

10. The exhaust gas pressure control valve according to claim 7, wherein the valve element is configured so as to correspond with an oblique opening of a pipeline member received at the first opening of the housing.

* * * * *